(12) United States Patent
Nishimura et al.

(10) Patent No.: US 10,852,572 B2
(45) Date of Patent: Dec. 1, 2020

(54) DISPLAY DEVICE

(71) Applicant: Tianma Japan, Ltd., Kanagawa (JP)

(72) Inventors: Hideki Nishimura, Kawasaki (JP);
Tetsuroh Asakura, Kawasaki (JP);
Futoshi Nakanishi, Kawasaki (JP)

(73) Assignee: TIANMA JAPAN, LTD., Kanagawa (JP)

( * ) Notice: Subject to any disclaimer, the term of this patent is extended or adjusted under 35 U.S.C. 154(b) by 20 days.

(21) Appl. No.: 16/198,076

(22) Filed: Nov. 21, 2018

(65) Prior Publication Data

US 2019/0162990 A1 May 30, 2019

(30) Foreign Application Priority Data

Nov. 24, 2017 (JP) .................................. 2017-225776

(51) Int. Cl.
*G02F 1/13* (2006.01)
*G02F 1/1343* (2006.01)
*G02F 1/133* (2006.01)
*G02F 1/167* (2019.01)
*G02F 1/1335* (2006.01)
*G09G 3/34* (2006.01)
(Continued)

(52) U.S. Cl.
CPC ........ *G02F 1/1323* (2013.01); *G02F 1/13306* (2013.01); *G02F 1/13439* (2013.01); *G02F 1/133512* (2013.01); *G02F 1/134309* (2013.01); *G02F 1/167* (2013.01); *G09G 3/344* (2013.01); *G09G 3/36* (2013.01); *G02F 1/13452* (2013.01); *G02F 2201/44* (2013.01); *G02F 2202/16* (2013.01)

(58) Field of Classification Search
None
See application file for complete search history.

(56) References Cited

U.S. PATENT DOCUMENTS

| 2008/0002110 A1* | 1/2008 | Choi ................. G02F 1/133514 349/106 |
| 2016/0077363 A1 | 3/2016 | Shiota |

(Continued)

FOREIGN PATENT DOCUMENTS

| JP | 2011-141498 A | 7/2011 |
| JP | 2016-062091 A | 4/2016 |

*Primary Examiner* — Edward J Glick
*Assistant Examiner* — David Y Chung
(74) *Attorney, Agent, or Firm* — Sughrue Mion, PLLC

(57) ABSTRACT

A display includes a first substrate, a second substrate, a liquid crystal layer between the first substrate and the second substrate, pixel driving electrodes for pixels, the pixel driving electrodes being provided on the first substrate and configured to provide control electric fields to the liquid crystal layer, louver elements, louver element driving electrodes provided on a face facing the first substrate of the second substrate, and an unseparated shield electrode between the louver element driving electrodes and the liquid crystal layer. Each of the louver elements are configured to stand on the second substrate, be sandwiched between one of the louver element driving electrodes and the shield electrode, and change amount of light to be transmitted in accordance with voltage applied across the louver element driving electrode and the shield electrode to change viewing angle.

5 Claims, 15 Drawing Sheets

(51) Int. Cl.
*G09G 3/36* (2006.01)
*G02F 1/1345* (2006.01)

(56) References Cited

U.S. PATENT DOCUMENTS

2017/0010516 A1\* 1/2017 Shiota ..................... G02F 1/167
2017/0097554 A1\* 4/2017 Shiota ..................... G02F 1/167

\* cited by examiner

DISPLAY DEVICE

CROSS-REFERENCE TO RELATED APPLICATIONS

This Non-provisional application claims priority under 35 U.S.C. § 119(a) on Patent Application No. 2017-225776 filed in Japan on Nov. 24, 2017, the entire content of which is hereby incorporated by reference.

BACKGROUND

This disclosure relates to a display device.

There is a demand that display devices be able to prevent peeking from the surround for privacy protection. As a device meeting this demand, a viewing angle adjustment film (louver) has been known that transmits the light to reach a desired area and blocks the light to reach an undesired area.

JP 2011-141498 A discloses an electro-optical device in which a louver for limiting the viewing angle is provided at boundaries between pixel regions. This disposition reduces the decrease and fluctuation in brightness caused by the lowered transmittance, even if a louver for limiting the viewing angle is provided.

However, the louver in JP 2011-141498 A is static and incapable of changing the viewing angle; the display device cannot be used to provide a wide viewing angle. JP 2016-62091 A discloses a light distribution control device that electrically controls the viewing angle with electrophoretic elements.

The light distribution control device (viewing angle control device) disclosed in JP 2016-62091 A attains dynamic control of the viewing angle of a display device and switching a narrow viewing angle and a wide viewing angle. However, the light distribution control device requires not only the electrophoretic elements for controlling the transmission of light but also electrodes for driving the electrophoretic elements.

SUMMARY

An aspect of this disclosure is a display device configured to display an image with a plurality of pixels, the display device including: a first substrate; a second substrate opposed to the first substrate; a liquid crystal layer between the first substrate and the second substrate; pixel driving electrodes for the plurality of pixels, the pixel driving electrodes being provided on the first substrate and configured to provide control electric fields to the liquid crystal layer; a plurality of louver elements; a plurality of louver element driving electrodes provided on a face facing the first substrate of the second substrate; an unseparated shield electrode between the plurality of louver element driving electrodes and the liquid crystal layer, the shield electrode being provided on the second substrate and grounded; and a controller configured to control potentials of the plurality of louver element driving electrodes. Each of the plurality of louver elements are configured to: stand on the second substrate; be sandwiched between one of the plurality of louver element driving electrodes and the shield electrode; and change amount of light to be transmitted in accordance with voltage applied across the louver element driving electrode and the shield electrode to change viewing angle.

It is to be understood that both the foregoing general description and the following detailed description are exemplary and explanatory and are not restrictive of this disclosure.

EMBODIMENTS

Hereinafter, embodiments of this disclosure will be described with reference to the accompanying drawings. The embodiments are merely examples to implement this disclosure and are not to limit the technical scope of this disclosure. Elements common to the drawings are denoted by the same reference signs. The drawings may exaggerate the sizes and the shapes of the elements for clarity of explanation. In each drawing, only a part of the elements of the same kind may be indicated with a reference sign.

First Embodiment

Configuration

Figure 1A:
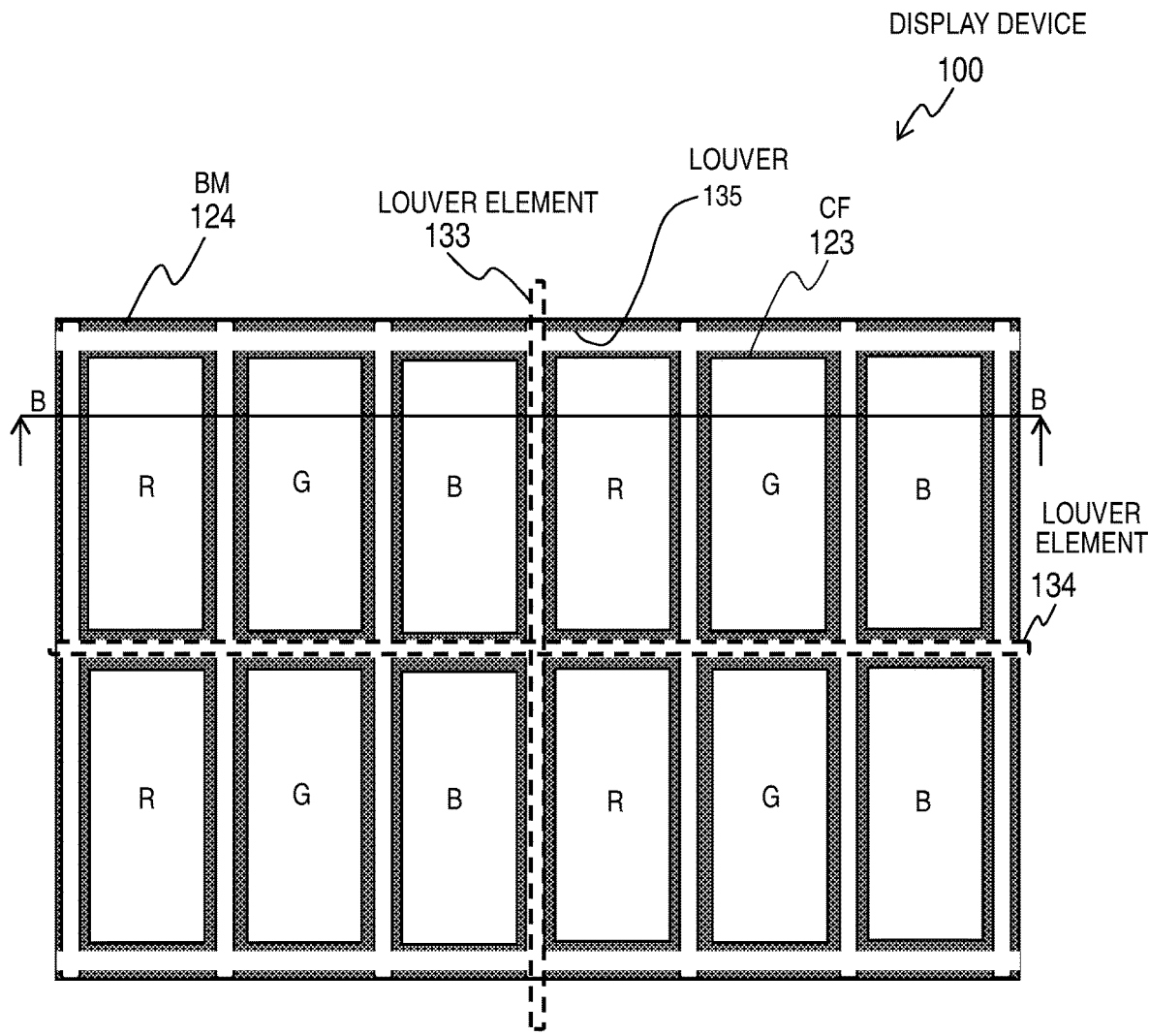
FIG. 1A is a plan diagram illustrating a part of the pixels in the display region of a display device in a configuration example of the first embodiment.

FIG. 1A is a plan diagram illustrating a part of the pixels in the display region of a display device in a configuration example of the first embodiment. FIG. 1A illustrates a partial configuration of a color filter substrate with color filters provided thereon. The display device 100 includes a plurality of pixels defined by a grid-like black matrix (BM) 124. The plurality of pixels are disposed in a matrix; each pixel includes a color filter (CF) 123 in red (R), green (G), or blue (B).

Although the pixels (color filters) in this example have the identical rectangular shapes, the pixels may have different shapes as desired and also, may be disposed as desired. In the example of FIG. 1A, only one of the plurality of pixel color filters is indicated with a reference sign 123.

The display device 100 includes a louver 135 for controlling the viewing angle (light distribution) of the display device 100. The louver 135 has a grid-like shape. When seen in the direction normal to the substrate (the stacking direction on the substrate) (in a planar view), the entirety of the louver 135 is included in the region of the black matrix 124.

The louver 135 is composed of a plurality of louver elements 133 extending in the vertical direction (column direction) in FIG. 1A and a plurality of louver elements 134 extending in the horizontal direction (row direction) in FIG. 1A. The vertical direction and the horizontal direction are perpendicular to each other. In FIG. 1A, only one of the louver elements extending in the vertical direction and only one of the louver elements in the horizontal direction are indicated with reference signs 133 and 134, respectively.

Each of the plurality of louver elements 133 extending in the vertical direction (the first direction) intersects with the plurality of louver elements 134 extending in the horizontal direction (the second direction) and links with the louver elements 134 at the individual intersections. In similar, each of the plurality of louver element 134 extending in the horizontal direction intersects with the plurality of louver elements 133 extending in the vertical direction and links with the louver elements 133 at the individual intersections. The louver elements 133 or 134 do not have to be straight. For example, the louver elements 133 or 134 may repeatedly bend to extend in the vertical direction or the horizontal direction.

In the example of FIG. 1A, the grid-like black matrix 124 have the same number of rows and columns as the grid-like louver 135. The black matrix 124 may have a larger number of rows and columns than the grid-like louver 135. The louver 135 may be configured in a stripe pattern. For example, the louver 135 in the example of FIG. 1A may omit the plurality of louver elements 133 to be composed of only the plurality of louver elements 134 or omit the plurality of louver elements 134 to be composed of only the plurality of louver elements 133.

The louver 135 in the example of FIG. 1A is disposed between color filters 123 of pixels, or outside of the color filters 123. The louver 135 may partially overlap with color filters 123 when seen in the direction normal to the substrate.

Figure 1B:
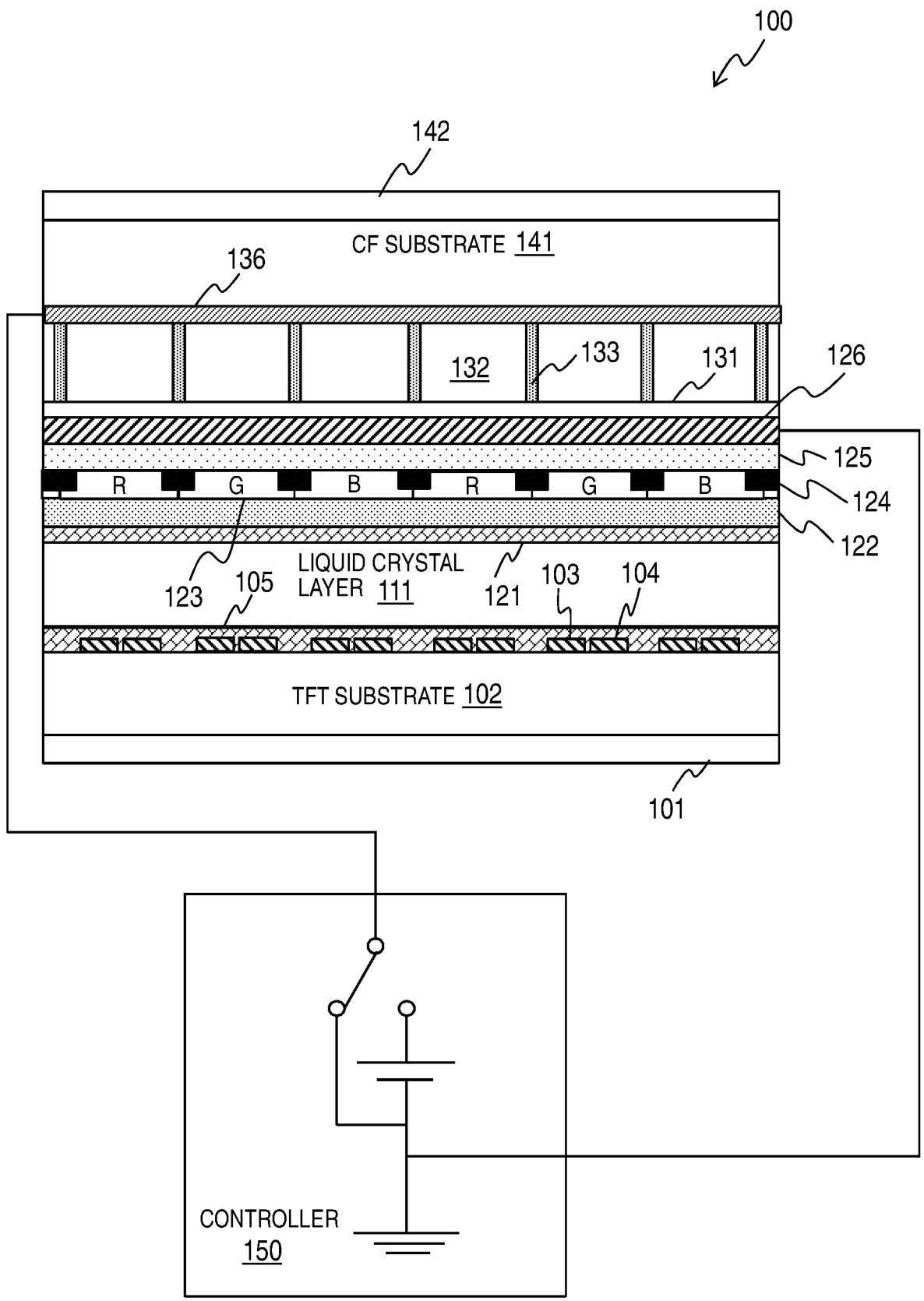
FIG. 1B schematically illustrates a cross-sectional structure of the display panel along the line B-B in FIG. 1A and a configuration included in a controller of the display device.

FIG. 1B schematically illustrates a cross-sectional structure of the display panel along the line B-B in FIG. 1A and a configuration included in the controller of the display device 100. FIG. 1B illustrates a partial configuration of the display device 100 and omits the remaining configuration including the backlight unit.

The display panel includes a thin film transistor (TFT) substrate 102 (first substrate) and a color filter (CF) substrate 141 (second substrate) opposed to the TFT substrate 102. The display device 100 in this example is a liquid crystal display device. A liquid crystal layer 111 is sandwiched between the TFT substrate 102 and the CF substrate 141. The display device 100 further includes a not-shown backlight unit.

The TFT substrate 102 is an insulative transparent substrate that is made of glass or resin. Although the typical TFT substrate 102 is transparent and colorless, it can be transparent and colored. The TFT substrate 102 can have a rectangular shape and one of the main faces is opposed to one of the main faces of the CF substrate 141. The TFT substrate 102 can be inflexible or flexible.

A polarizing plate 101 is attached on the main face opposite from the liquid crystal layer 111 of the TFT substrate 102. Liquid crystal driving electrodes 103 (pixel driving electrodes) and opposite electrodes 104 for providing an electric field to the liquid crystal layer 111 are arrayed on the main face facing the liquid crystal layer 111 of the TFT substrate 102. One pair of a liquid crystal driving electrode 103 and an opposite electrode 104 provides an electric field to the liquid crystal of one pixel. The amount of light to be transmitted through the pixel changes depending on the applied electric field. A not-shown TFT array for selecting pixels to be controlled is formed on the TFT substrate 102. Each TFT is a control element for controlling the amount of light in a pixel.

The configuration example in FIG. 1B is of a horizontal electric field control type of liquid crystal display device. The horizontal electric field control type of liquid crystal display devices include in-plane switching (IPS) type and fringe-field switching (FFS) type of liquid crystal display devices. In FIG. 1B, only one of the plurality of liquid crystal driving electrodes is indicated with a reference sign 103 and only one of the plurality of opposite electrodes is indicated with a reference sign 104.

An alignment film 105 is provided to cover the electrode layer including the liquid crystal driving electrodes 103 and the opposite electrodes 104. The alignment film 105 is in contact with the liquid crystal layer 111 to regulate the arrangement of the liquid crystal molecules when no electric field is applied. The liquid crystal material of the liquid crystal layer 111 can be negative liquid crystal. The negative liquid crystal is less affected by the external electric field in the direction normal to the main face of the display panel. The liquid crystal layer 111 can be made of positive liquid crystal.

The CF substrate 141 is an insulative transparent substrate that is made of glass or resin. Although the typical CF substrate 141 is transparent and colorless, it can be transparent and colored. The CF substrate 141 can have a rectangular shape and be inflexible or flexible. A polarizing plate 142 is attached on the main face opposite from the liquid crystal layer 111 of the CF substrate 141.

A louver driving electrode 136 is provided on the main face facing the liquid crystal layer 111 of the CF substrate 141. In the example of FIG. 1B, the louver driving electrode 136 can be an unseparated planar transparent metal layer. The louver driving electrode 136 can be made of ITO or ZnO and typically, it is transparent and colorless.

The louver driving electrode 136 may have the same shape as the louver 135. For example, the louver driving electrode 136 can have a grid-like or stripe-like shape, like the louver 135. The louver driving electrode 136 is provided to cover the entirety of the louver 135 when seen in the direction normal to the CF substrate 141. The louver driving electrode 136 in the example of FIG. 1B is a planar transparent metal layer covering the entire region of the louver 135.

In this disclosure, the driving electrode opposed to a louver element 133 to control the louver element 133 is referred to as louver element driving electrode. In the example of FIGS. 1A and 1B, the louver element driving electrode is a part of the louver driving electrode 136 of a single unseparated metal layer and a part fully overlapping with (opposed to) a louver element 133.

An insulative transparent resin layer 132 is laminated on the louver driving electrode 136. The louver 135 is formed in the transparent resin layer 132. Typically, the transparent resin layer 132 is transparent and colorless. The transparent resin layer 132 can be made of a photocurable resin and the louver 135 is formed in the transparent resin layer 132. Each louver element 133 is penetrating the transparent resin layer 132 in the stacking direction on the CF substrate 141 (the vertical direction in FIG. 1B).

Although the detailed configuration of the louver element 133 will be described later, the louver element 133 in the example of FIG. 1B is composed of dispersion medium and colored electrophoretic particles contained in a groove formed in the transparent resin layer 132. An insulative sealing layer 131 is provided on the transparent resin layer 132. The sealing layer 131 seals up the grooves of the transparent resin layer 132 formed for the louver 135. The sealing layer 131 can be omitted. An insulating layer can be provided between the louver 135 (the transparent resin layer 132) and the louver driving electrode 136.

A shield electrode 126 is laminated on the sealing layer 131. The shield electrode 126 is grounded (provided with the ground potential) to shield the electric field from the louver driving electrode 136 or the external of the display device toward the liquid crystal layer 111. In the example of FIG. 1B, the shield electrode 126 can be an unseparated planar transparent metal layer. The shield electrode 126 can be made of ITO or ZnO and typically, it is transparent and colorless. The shield electrode 126 covers the entire region of the louver 135. The shield electrode 126 may cover the entire display region.

In the configuration example of FIG. 1B, the louver 135 is sandwiched between the louver driving electrode 136 and the shield electrode 126. The louver 135 changes the amount of light to be transmitted in accordance with the voltage across the louver driving electrode 136 and the shield electrode 126. In other words, the shield electrode 126 is an electrode opposed to the louver driving electrode 136 to drive the louver 135.

One electrode (shield electrode 126) functioning as a shield electrode and an electrode for driving the louver reduces the number of components of the display panel and as a result, reduces the thickness of the display panel and further, increases the manufacturing efficiency. The shield electrode 126 may have any shape as far as it can shield the electric field that adversely affects the liquid crystal layer 111.

An insulating layer 125 is laminated on the shield electrode 126. The insulating layer 125 can be omitted. A grid-like black matrix 124 for defining pixels is laminated on the insulating layer 125. The black matrix 124 can be a thin film made of a black resin or a metal containing a chromic material. The region of each pixel surrounded by the black matrix 124 is provided with a color filter 123 in red, green, or blue. The color filter layer is composed of color filters in these three colors; a color filter in a specific color is composed of the color filters 123 for a plurality of pixels of the color.

An insulative overcoat layer 122 is laminated on the color filters 123. The overcoat layer 122 can be omitted. An alignment film 121 is laminated on the overcoat layer 122. The alignment film 121 is in contact with the liquid crystal layer 111 and regulates the arrangement of the liquid crystal molecules when no electric field is applied.

A not-shown backlight unit is provided behind (on the back of) the display panel. Either the TFT substrate 102 or the CF substrate 141 is on the front side where the user to see the image is located and the other substrate is on the back side. In other words, the backlight unit is provided under the TFT substrate 102 or above the CF substrate 141 of the display panel in FIG. 1B.

In the configuration where the backlight unit is provided on the side of the TFT substrate 102, the louver 135 controls the outgoing angle of the light transmitted through the liquid crystal layer 111 and the color filters 123. In the configuration where the backlight unit is provided on the side of the CF substrate 141, the louver 135 controls the incident angle of the light emitted from the backlight unit onto the color filters 123. In the following, an example where the backlight unit is provided on the side of the TFT substrate 102 is described.

Operation

The liquid crystal layer 111 controls the amount of light from the backlight unit that passes through the liquid crystal layer 111 within each pixel in accordance with the electric field between the liquid crystal driving electrode 103 and the opposite electrode 104 for the pixel. The louver 135 has a function to control the viewing angle by controlling the traveling direction of the light that passes through the louver 135. The display device 100 (the louver 135) has a wide viewing angle mode and a narrow viewing angle mode. The mode in which the range of direction the light goes out from the display device 100 is wide is referred to as wide viewing angle mode and the mode in which the range of the direction the light goes out from the display device 100 is narrow is referred to as narrow viewing angle mode.

The controller 150 has a function to control the potentials of the liquid crystal driving electrodes 103 and the opposite electrodes 104 of individual pixels. The controller 150 controls the potentials of the liquid crystal driving electrodes 103 and the opposite electrodes 104 of individual pixels in accordance with the image data to control the amounts of light to be transmitted through the pixels.

The controller 150 further has a function to control the potentials of the shield electrode 126 and the louver driving electrode 136. In the example of FIG. 1B, the controller 150 maintains the shield electrode 126 at the ground potential. The controller 150 provides a predetermined fixed potential to the louver driving electrode 136 in each of the wide viewing angle mode and the narrow viewing angle mode. The controller 150 may switch the wide viewing angle mode and the narrow viewing angle mode in accordance with a user input through a not-shown interface.

FIG. 1B illustrates a narrow viewing angle mode. In the narrow viewing angle mode, the controller 150 provides the louver driving electrode 136 with the ground potential. The potential of the louver driving electrode 136 is equal to the potential of the shield electrode 126 and the voltage across these electrodes is maintained at 0 V. In the narrow viewing angle mode, the louver elements 133 are in a light blocking state.

Figure 1C:
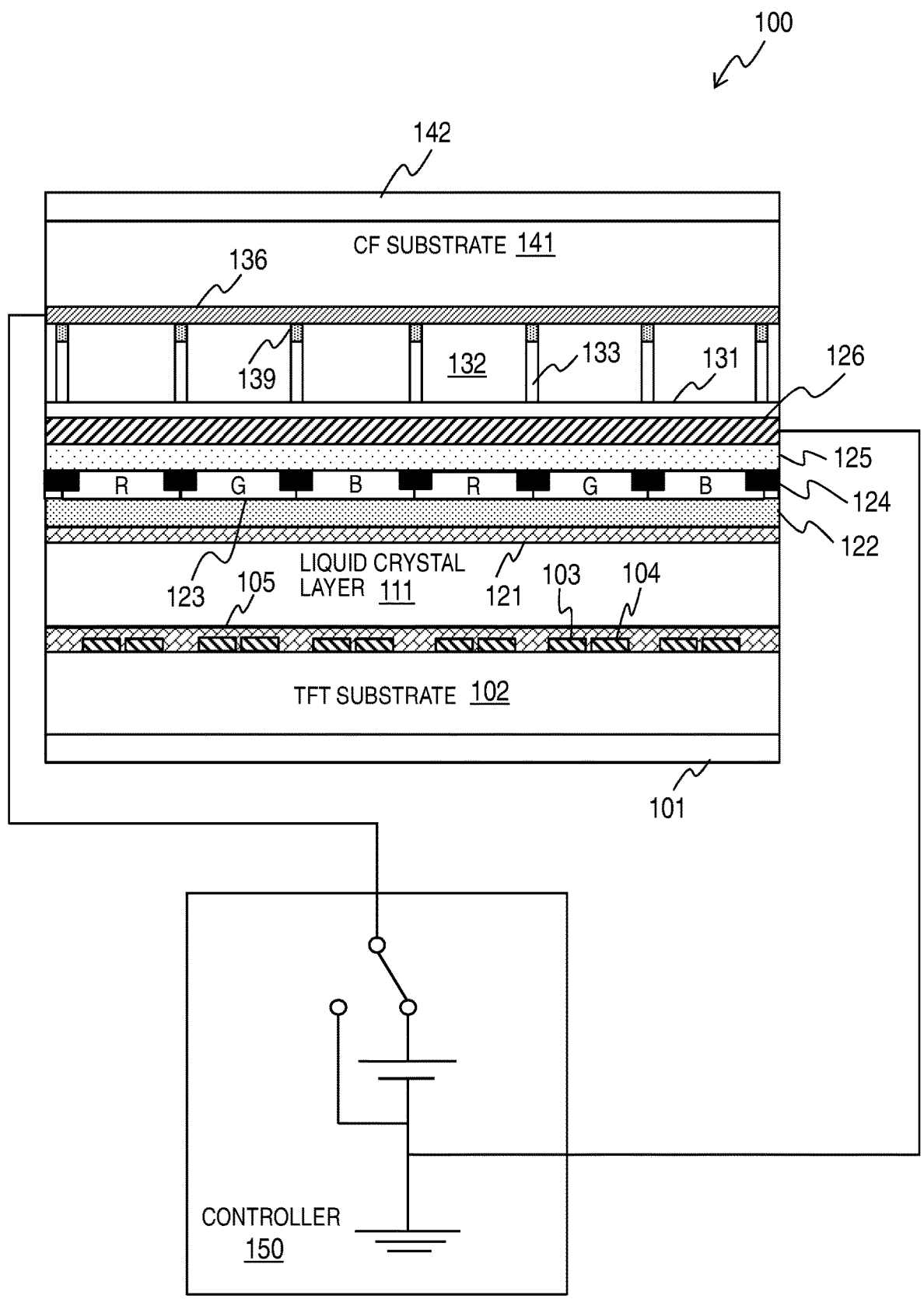
FIG. 1C schematically illustrates a cross-sectional structure of the display panel along the line B-B in FIG. 1A and a configuration included in a controller of the display device.

FIG. 1C illustrates a wide viewing angle mode. In the wide viewing angle mode, the controller 150 provides the louver driving electrode 136 with a predetermined potential higher than the ground potential (predetermined positive potential). The potential of the louver driving electrode 136 is higher than the potential of the shield electrode 126 and the voltage across these electrodes is maintained at a predetermined voltage by using the louver driving electrode 136 as positive electrode. In the wide viewing angle mode, the louver elements 133 are in a transmissive state.

Figure 2A:
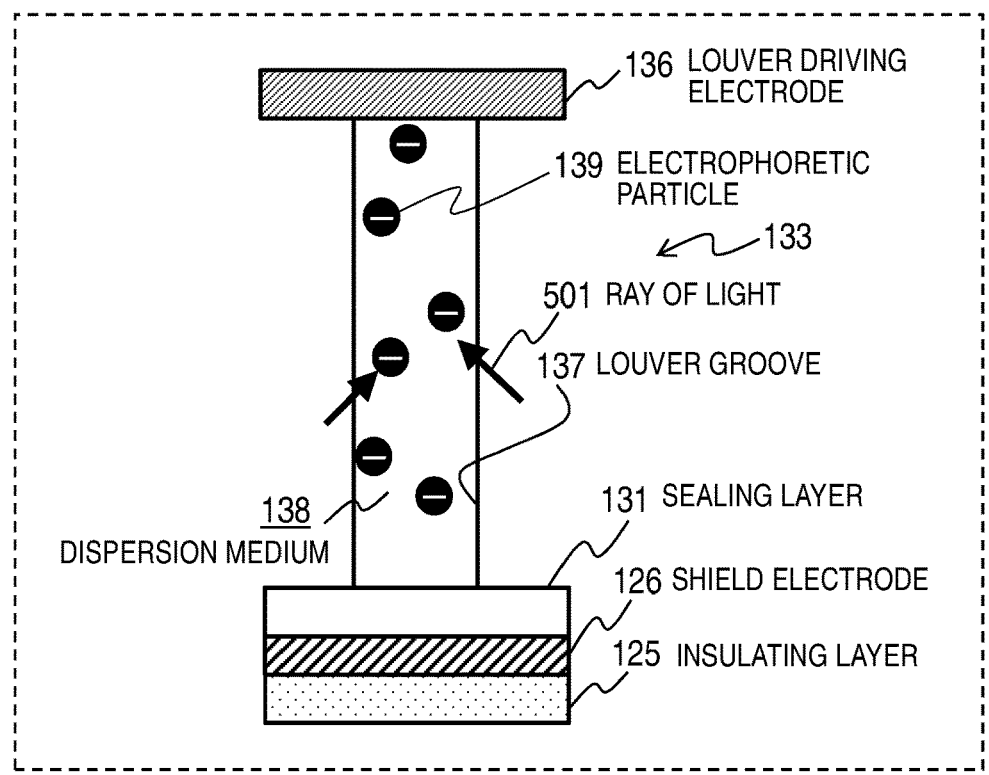
FIG. 2A schematically illustrates a louver element in a narrow viewing angle mode.
Figure 2B:
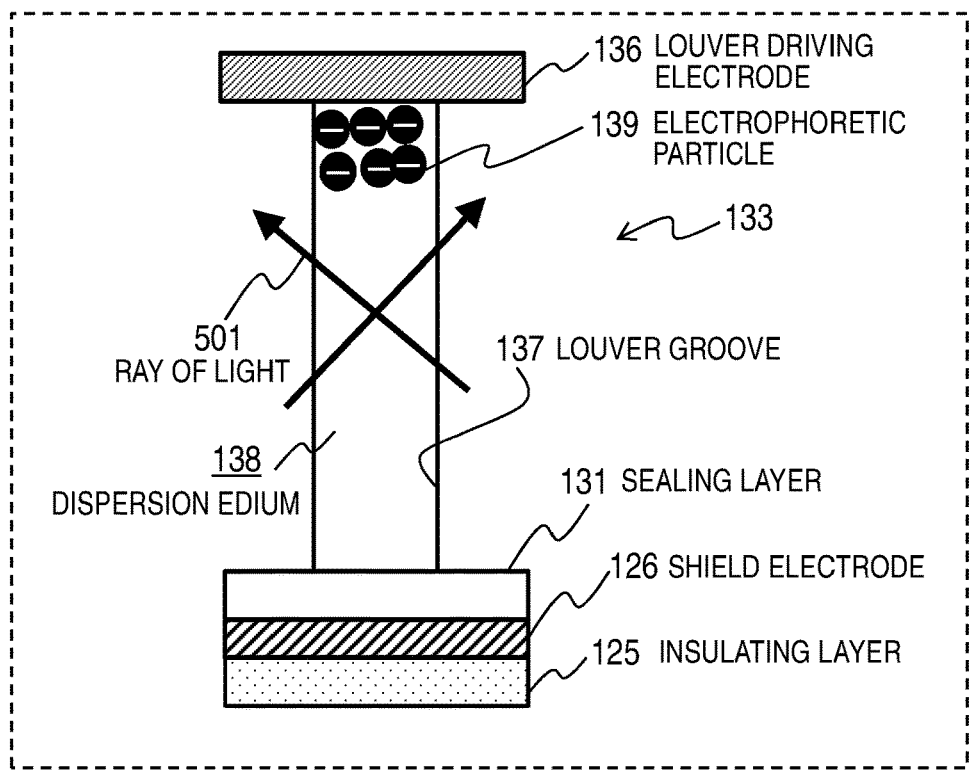
FIG. 2B schematically illustrates a louver element in a wide viewing angle mode.

FIG. 2A schematically illustrates a louver element 133 in a narrow viewing angle mode. FIG. 2B schematically illustrates a louver element 133 in a wide viewing angle mode. The louver element 133 includes electrophoretic particles 139 and dispersion medium 138 contained in a louver groove 137 (space) formed in the transparent resin layer 132. The electrophoretic particles 139 are colored, for example, in black. The dispersion medium 138 is made of a transparent and colorless liquid material. The louver 135 changes the range of direction to transmit light by changing the state of the colored electrophoretic particles (colored charged particles) 139 within the dispersion medium 138.

Each louver element 133 is sandwiched by the shield electrode 126 and the louver driving electrode 136. In the example of FIGS. 2A and 2B, the louver driving electrode 136 is in contact with the electrophoretic element material including electrophoretic particles 139 and dispersion medium 138. An insulating layer may be provided between the louver driving electrode 136 and the electrophoretic element material. The insulating layer can be made of silicon oxide or silicon nitride.

With reference to FIG. 2A representing a narrow viewing angle mode, the electrophoretic particles 139 in the louver element 133 are uniformly dispersed in the dispersion medium 138. The dispersed electrophoretic particles 139 absorb light, so that the louver element 133 blocks the light from color filters 123. As a result, only the rays of light 501 within a narrow range of outgoing angle pass through the louver 135.

In the narrow viewing angle mode, the shield electrode 126 and the louver driving electrode 136 sandwiching a louver element 133 are maintained at the same potential (ground potential). As a result, the electrophoretic particles 139 are dispersed in the dispersion medium 138 and maintained in the state where the electrophoretic particles 139 are uniformly dispersed in the dispersion medium 138.

With reference to FIG. 2B representing a wide viewing angle mode, the electrophoretic particles 139 are collected at the proximity of either one of the electrodes sandwiching the louver element 133. In the example of FIG. 2B, the electrophoretic particles 139 are collected at the proximity of the louver driving electrode 136. Most region of the louver element 133 is composed of only the transparent dispersion medium 138; the louver element 133 is in a transmissive state. In this state, the rays of light 501 within a wide range of outgoing angle pass through the louver 135.

In the example of FIG. 2B, the relative potential of the louver driving electrode 136 to the potential of the shield electrode 126 has the polarity opposite to the charge of the electrophoretic particles 139 (with a potential difference V). As a result, the electrophoretic particles 139 gather to the proximity of the louver driving electrode 136.

For example, when the charge of the electrophoretic particles 139 is negative (−) and the louver driving electrode 136 is a positive electrode, the electrophoretic particles 139 gather to the proximity of the louver driving electrode 136. In similar, when the charge of the electrophoretic particles 139 is positive (+) and the louver driving electrode 136 is a negative electrode, the electrophoretic particles 139 gather to the proximity of the louver driving electrode 136. The potential difference V is to be approximately 20 to 25 V.

Contrarily, the relative potential of the louver driving electrode 136 to the potential of the shield electrode 126 can have the same polarity as the charge of the electrophoretic particles 139 (with a potential difference V). As a result, the electrophoretic particles 139 gather to the proximity of the shield electrode 126. For example, when the charge of the electrophoretic particles 139 is negative (−) and the louver driving electrode 136 is a negative electrode, the electrophoretic particles 139 gather to the proximity of the shield electrode 126. In similar, when the charge of the electrophoretic particles 139 is positive (+) and the louver driving electrode 136 is a positive electrode, the electrophoretic particles 139 gather to the proximity of the shield electrode 126.

As described with reference to FIG. 1A, the entire louver 135 overlaps with the black matrix 124 in a planar view. Since the electrophoretic particles 139 are included in the region of the black matrix 124 in the planar view, the decrease of the transmittance because of the louver 135 in the wide viewing angle mode can be made small.

In the case where the electrophoretic particles 139 gather to the proximity of the shield electrode 126 located closer to the black matrix 124, the electrophoretic particles 139 do not intercept a display pixel when obliquely viewed in a wide viewing angle mode and therefore, higher viewing angle characteristics are attained.

The louver 135 may have a configuration different from the above-described one including electrophoretic particles 139 in dispersion medium 138. For example, the louver 135 may diffuse the light in a narrow viewing angle mode. For example, the louver 135 may be made of an electrochromic material showing electrochromism. The electrochromic material changes the amount of light to be transmitted depending on the applied voltage. The same applies to the other embodiments.

As described above, embedding the louver 135 between the CF substrate 141 and the TFT substrate 102 achieves a thinner liquid crystal panel with an active louver integrated. Furthermore, aligning the louver 135 with the black matrix 124 achieves a small decrease in transmittance because of the louver 135.

One of the electrodes for driving the louver 135 is the grounded shield electrode 126. This configuration prevents driving the liquid crystal layer 111 from being affected by the electric field generated by the driving voltage for the louver 135 or the electric field from the external of the device. Although a horizontal electric field control type of liquid crystal display device is easily affected by the electric field from the external, one of the driving electrodes for the louver 135 functioning as a shield electrode allows elimination of a dedicated shield electrode.

Second Embodiment

Figure 3:
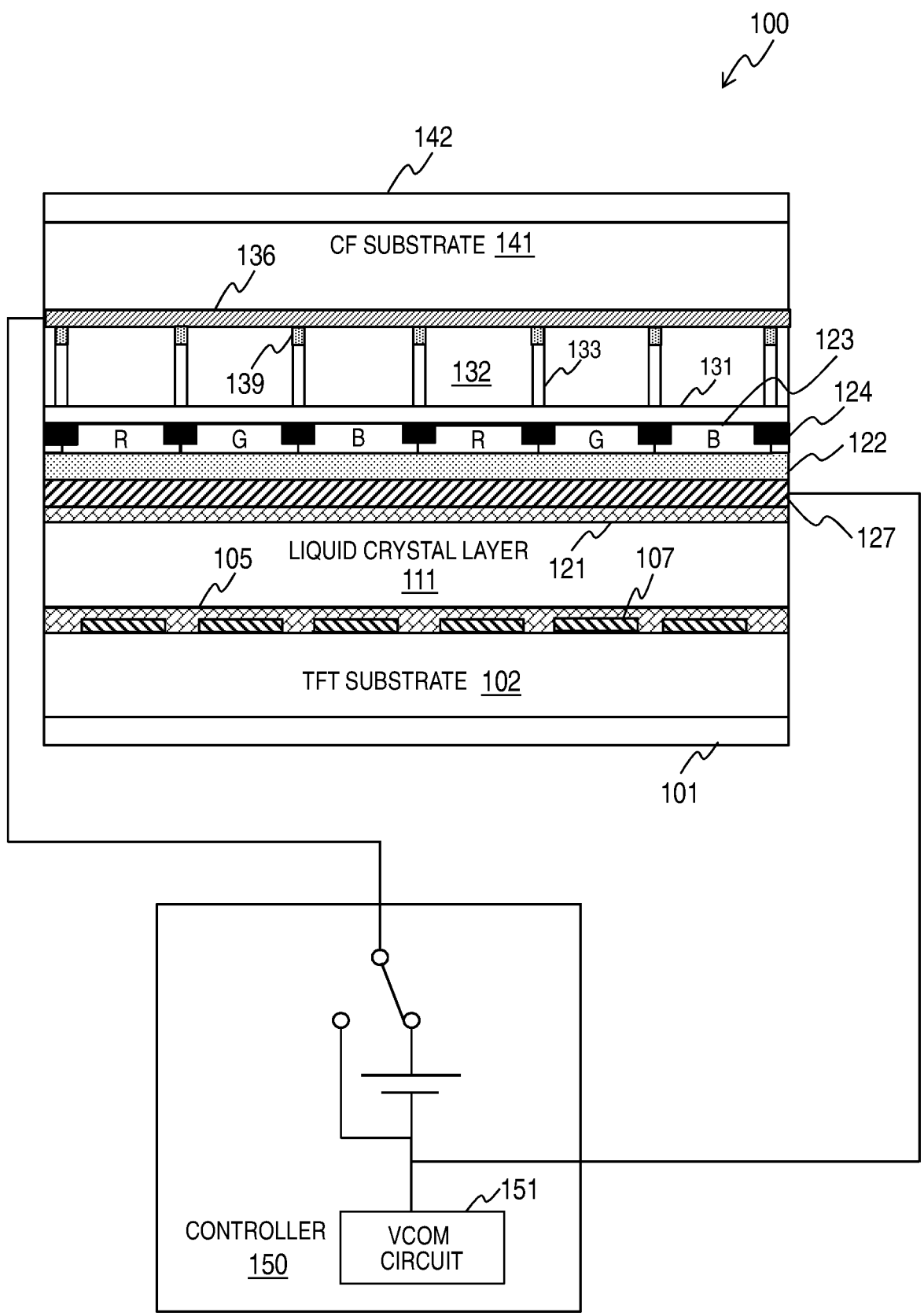
FIG. 3 schematically illustrates a configuration of a display device in the second embodiment.

FIG. 3 schematically illustrates a configuration of a display device 100 in the second embodiment. FIG. 3 schematically illustrates a cross-sectional structure of the display panel and a configuration included in the controller of the display device 100. FIG. 3 illustrates a partial configuration of the display device 100 and omits the remaining configuration including the backlight unit. Hereinafter, differences from the first embodiment are mainly described.

Instead of the liquid crystal driving electrodes 103 and the opposite electrodes 104, pixel electrodes 107 (pixel driving electrodes) are provided on the TFT substrate 102. The pixel electrodes 107 are liquid crystal driving electrodes for applying an electric field to the liquid crystal of the associated pixel. The pixel electrodes 107 are transparent electrodes and can be made of ITO or ZnO.

Instead of the shield electrode 126, an opposite electrode 127 is laminated on the CF substrate 141. The opposite electrode 127 is provided between the alignment film 121 and the overcoat layer 122. The opposite electrode 127 is an unseparated planar transparent electrode and can be made of ITO or ZnO. The opposite electrode 127 is common to the pixels.

The configuration example in FIG. 3 is of a vertical electric field control type of liquid crystal display device. The vertical electric field control type of liquid crystal display devices include twisted nematic (TN) type and vertical alignment (VA) type of liquid crystal display devices. In FIG. 3, only one of the plurality of pixel electrodes is indicated with a reference sign 107. The liquid crystal for each pixel in the liquid crystal layer 111 is sandwiched by the opposite electrode 127 and a pixel electrode 107; the orientation and the transmittance of the liquid crystal in the pixel changes depending on the voltage across these electrodes.

The controller 150 includes a VCOM circuit 151 for providing the opposite electrode 127 with a predetermined potential (COM potential). The VCOM circuit 151 provides the opposite electrode 127 with a potential signal that is invariable or varies at specified times.

The louver 135 changes the angular range to transmit light (viewing angle) in accordance with the voltage across the louver driving electrode 136 and the opposite electrode 127. FIG. 3 illustrates a wide viewing angle mode. In the wide viewing angle mode, the controller 150 provides the louver driving electrode 136 with a potential obtained by applying a predetermined voltage to the COM potential. In the narrow viewing angle mode, the controller 150 provides the louver driving electrode 136 with the potential equal to the COM potential.

Figure 4:
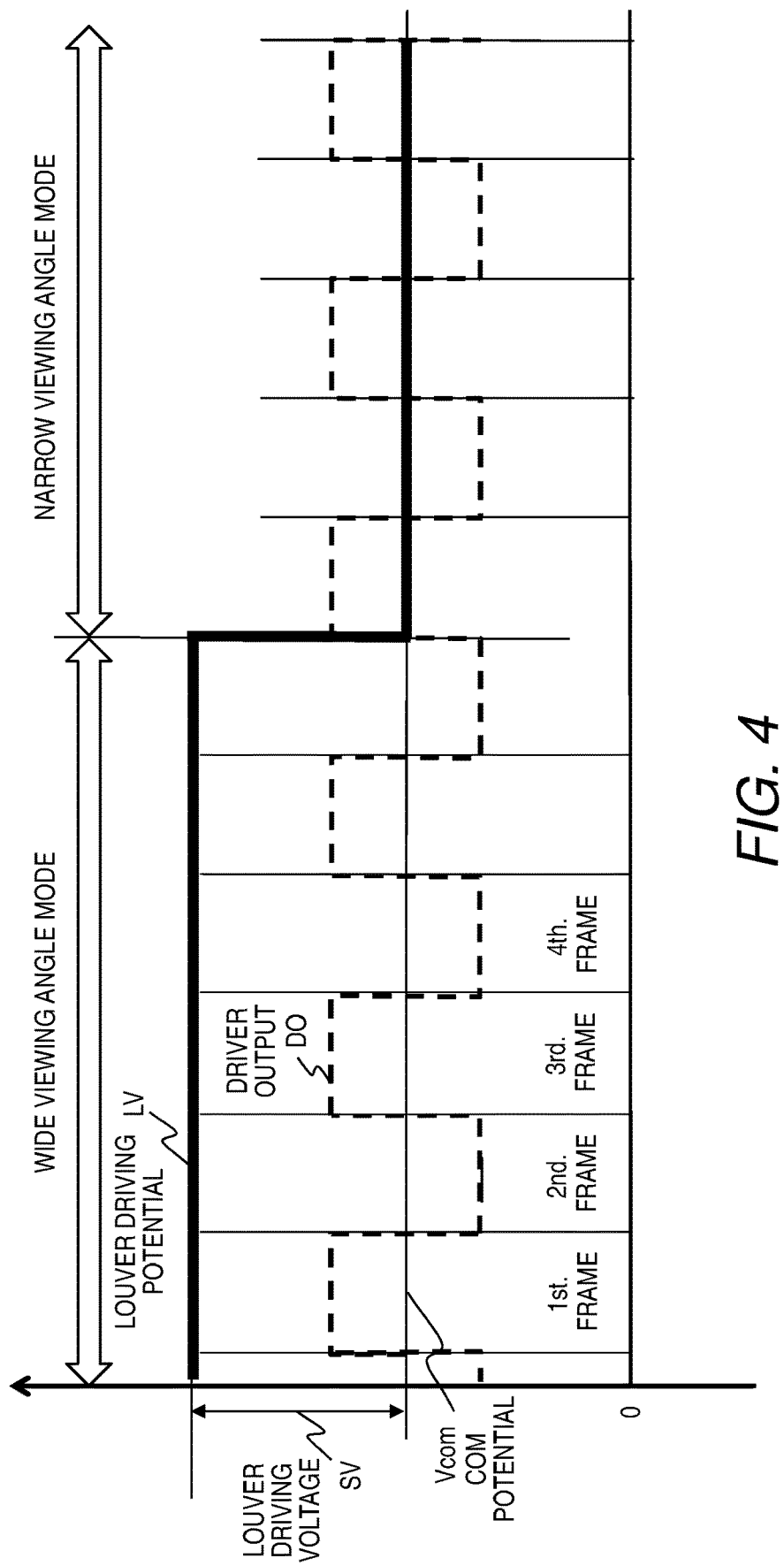
FIG. 4 schematically illustrates a temporal variation in louver driving potential to be given to a louver driving electrode, a temporal variation in COM potential to be given to the opposite electrode for the liquid crystal, and a temporal variation in driver output potential to be output to a pixel electrode.

FIG. 4 schematically illustrates a temporal variation in louver driving potential (LV) to be given to the louver driving electrode 136, a temporal variation in COM potential (Vcom) to be given to the opposite electrode 127 for the liquid crystal, and a temporal variation in driver output potential (DO) to be output to a pixel electrode 107. FIG. 4 indicates only the polarity of the driver output potential (DO) relative to the COM potential (Vcom). In the example of FIG. 4, the driver output potential (DO) is inverted with respect to the COM potential (Vcom) frame by frame.

In the example of FIG. 4, the COM potential (Vcom) is fixed. The driver output potential (DO) inverts its polarity with respect to the COM potential (Vcom) frame by frame. The louver driving potential (LV) in the wide viewing angle mode is higher than the COM potential (Vcom) by a predetermined voltage.

The louver driving voltage SV is a potential difference (voltage) of at the louver driving potential (LV) from the COM potential (Vcom). In a wide viewing angle mode, the louver driving voltage SV is maintained at a predetermined positive value. Accordingly, as described with reference to FIG. 2B, the negatively charged electrophoretic particles 139 gather to the proximity of the louver driving electrode 136 to transmit almost all incident light.

In a narrow viewing angle mode, the louver driving voltage SV is maintained at 0 V. Accordingly, as described with reference to FIG. 2A, the electrophoretic particles 139 uniformly disperses in the dispersion medium 138 to absorb the incident light.

Figure 5:
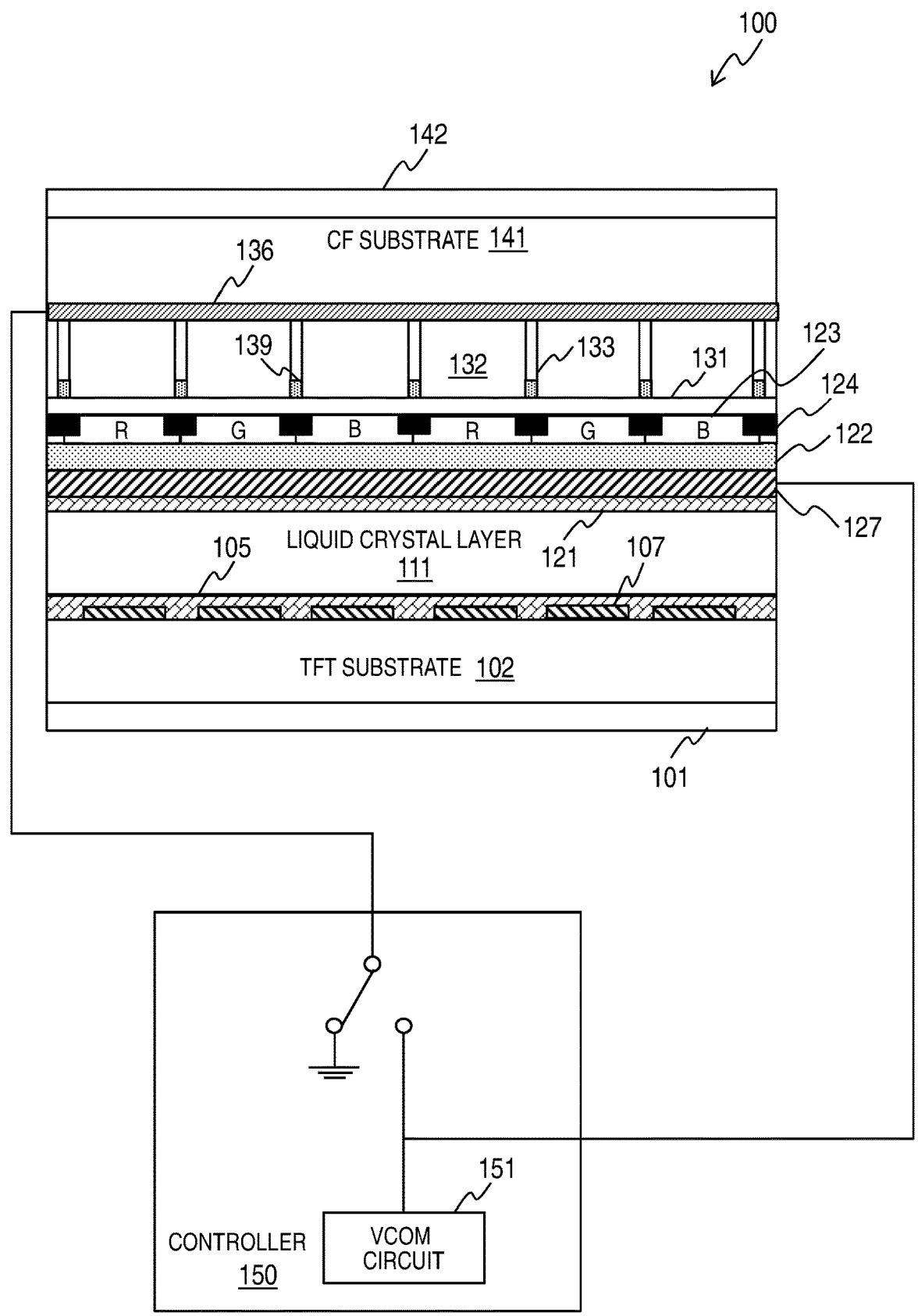
FIG. 5 illustrates another configuration example of the display device in the second embodiment.

FIG. 5 illustrates another configuration example of the display device 100. The configuration is the same as the configuration illustrated in FIG. 3, except for the controller 150. The controller 150 controls the louver 135 (the louver driving electrode 136) by a method different from the method described with reference to FIGS. 3 and 4. FIG. 5 illustrates a wide viewing angle mode. The controller 150 provides the louver driving electrode 136 with the ground potential in the wide viewing angle mode.

Figure 6:
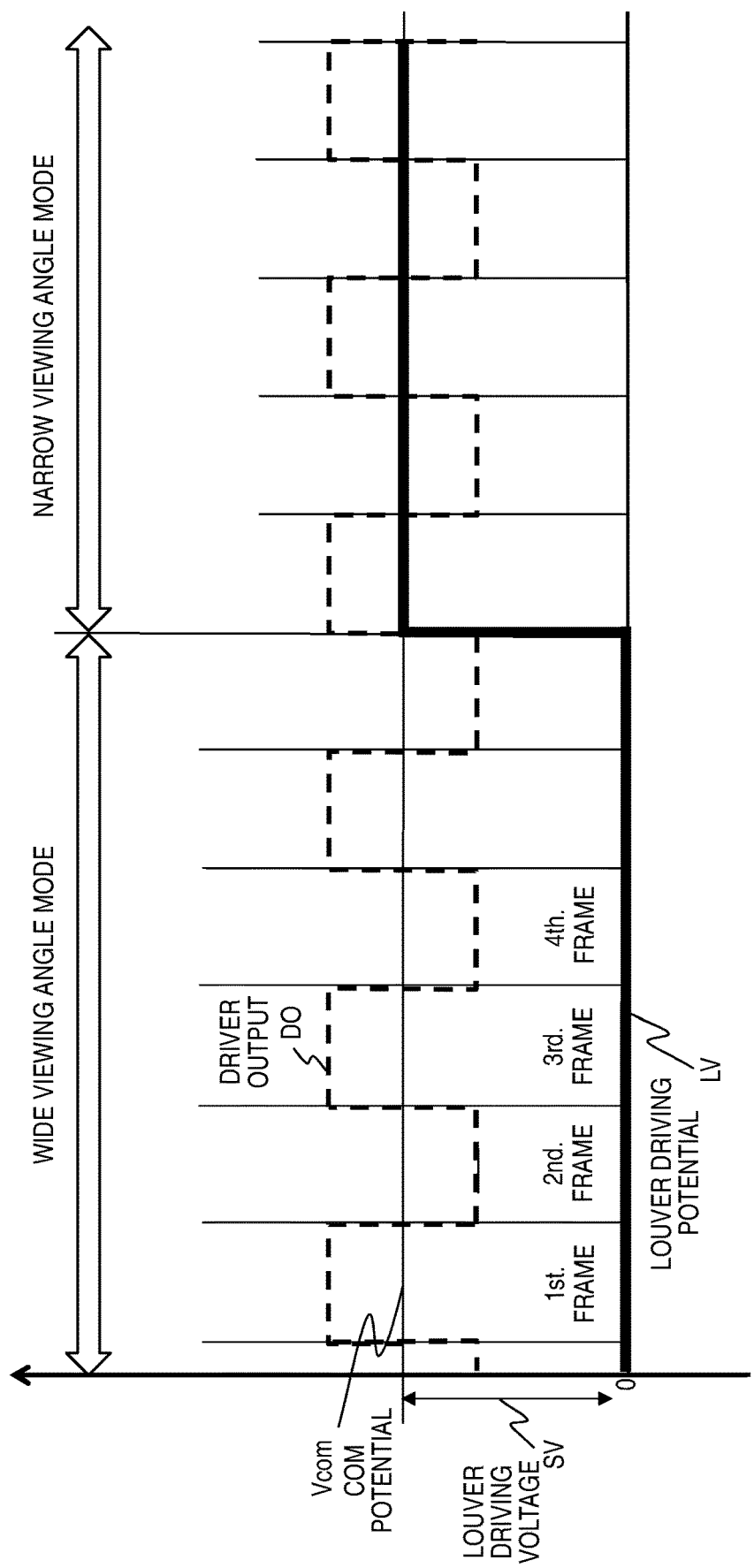
FIG. 6 schematically illustrates a temporal variation in louver driving potential to be given to a louver driving electrode, a temporal variation in COM potential to be given to the opposite electrode for the liquid crystal, and a temporal variation in driver output potential to be output to a pixel electrode in the configuration example in FIG. 5.

FIG. 6 schematically illustrates a temporal variation in louver driving potential (LV) to be given to the louver driving electrode 136, a temporal variation in COM potential (Vcom) to be given to the opposite electrode 127 for the liquid crystal, and a temporal variation in driver output potential (DO) to be output to a pixel electrode 107 in the configuration example illustrated in FIG. 5.

FIG. 6 indicates only the polarity of the driver output potential (DO) relative to the COM potential (Vcom). In the example of FIG. 6, the driver output potential (DO) is inverted with respect to the COM potential (Vcom) frame by frame.

In the example of FIG. 6, the COM potential (Vcom) is at a predetermined positive value. The driver output potential (DO) inverts its polarity with respect to the COM potential (Vcom) frame by frame. In a wide viewing angle mode, the louver driving potential (LV) is grounded and is lower than the COM potential (Vcom) by a predetermined voltage (Vcom). In a narrow viewing angle mode, the louver driving potential (LV) is equal to the COM potential (Vcom).

In a wide viewing angle mode, the louver driving voltage SV is maintained at a predetermined negative value. The louver driving voltage LV is negative relative to the COM voltage (Vcom) of the opposite electrode 127. The negatively charged electrophoretic particles 139 gather to the proximity of the positive opposite electrode 127. In a narrow viewing angle mode, the louver driving voltage SV is maintained at 0 V. Accordingly, the electrophoretic particles 139 uniformly disperses in the dispersion medium 138.

As described above, this embodiment shares one electrode in driving the liquid crystal layer 111 and the louver 135. Specifically, one of the driving electrodes of the louver 135 is in common with the opposite electrode of the liquid crystal layer 111. This configuration reduces the components of the display panel. Furthermore, the configuration example where the electrophoretic particles 139 gather to the proximity of the opposite electrode 127 in a wide viewing angle mode collects the electrophoretic particles 139 to the proximity of the black matrix 124. As a result, the electrophoretic particles 139 do not intercept a display pixel when obliquely viewed in a wide viewing angle mode and therefore, the viewing angle characteristics improve.

Third Embodiment

Figure 7:
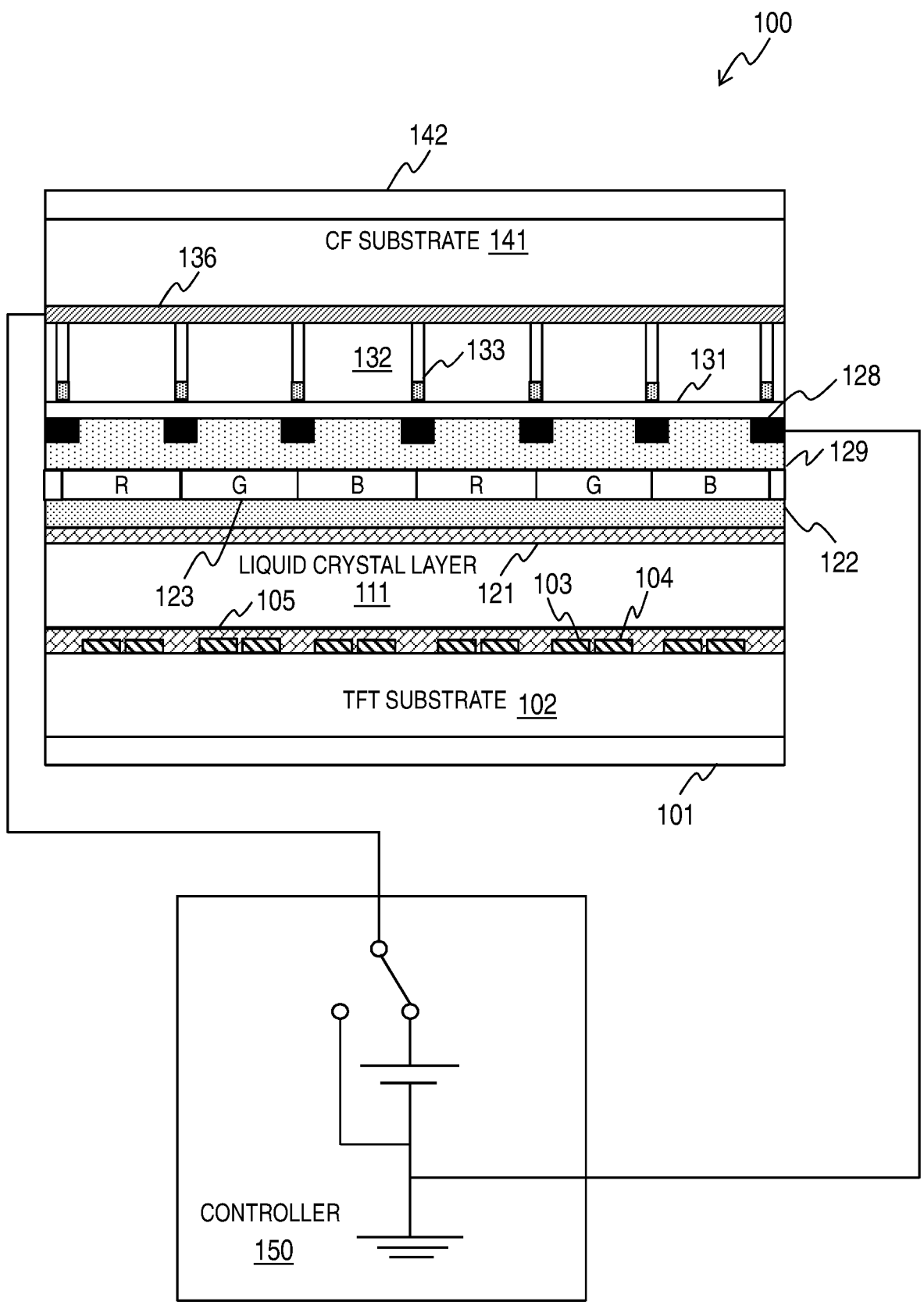
FIG. 7 illustrates a configuration example of a display device in the third embodiment.

FIG. 7 schematically illustrates a configuration example of the display device 100 in the third embodiment. FIG. 7 schematically illustrates a cross-sectional structure of the display panel and a configuration included in the controller of the display device 100. FIG. 7 illustrates a partial configuration of the display device 100 and omits the remaining configuration including the backlight unit. The display device 100 in FIG. 7 is a horizontal electric field control type of liquid crystal display device. Hereinafter, differences from the first embodiment are mainly described.

The configuration example in FIG. 7 omits the shield electrode 126 on the CF substrate 141 shown in FIG. 1C. In the configuration example in FIG. 7, a conductive black matrix 128 applies the voltage for driving the louver 135, in place of the shield electrode 126.

As illustrated in FIG. 7, a conductive black matrix 128 is laminated on the sealing layer 131 for sealing the louver grooves 137. The conductive black matrix 128 can be made of a conductive resin or a metal and is formed of one or more layers (sublayers). An example of the conductive black matrix 128 is made of a photocurable resin containing carbon black dispersed therein. The material for the conductive black matrix 128 can be selected as desired.

An insulative planarization layer 129 is laminated on the conductive black matrix 128. The planarization layer 129 increases the thickness of the conductive black matrix 128 to reduce the resistance thereof. The planarization layer 129 can be omitted. Color filters 123 are laminated on the planarization layer 129.

The conductive black matrix 128 functions as one of the driving electrodes for the louver 135. Each louver element 133 is sandwiched by the louver driving electrode 136 on one side and the conductive black matrix 128 on the other side. All faces on the other side of the louver elements 133 face the conductive black matrix 128.

The controller 150 provides the conductive black matrix 128 with the ground potential. The controller 150 provides the louver driving electrode 136 with different potentials in the narrow viewing angle mode and the wide viewing angle mode. FIG. 7 illustrates a wide viewing angle mode. The controller 150 provides the louver driving electrode 136 with a fixed positive potential.

Figure 8:
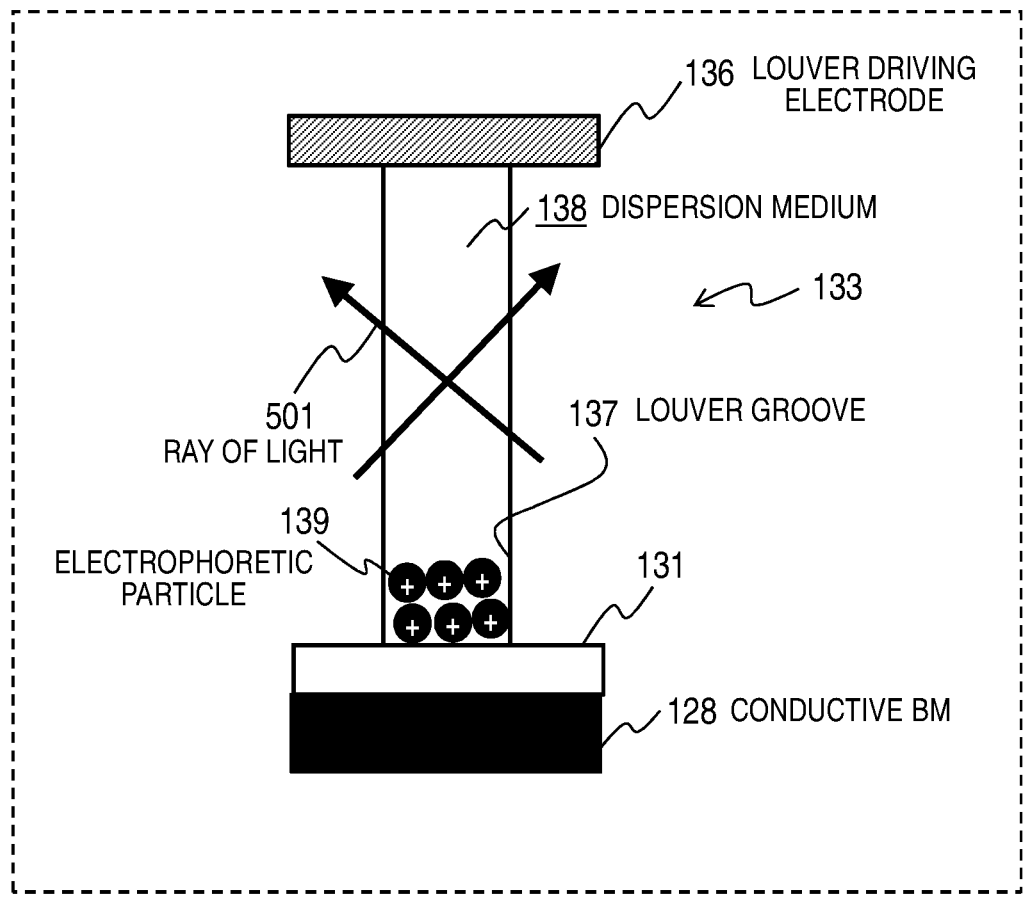
FIG. 8 schematically illustrates a state of a louver element in a wide viewing angle mode in the configuration example in FIG. 7.

FIG. 8 schematically illustrates a state of a louver element 133 in a wide viewing angle mode in the configuration example in FIG. 7. The electrophoretic particles 139 are positively charged. The polarity of the conductive black matrix 128 is negative and the polarity of the louver driving electrode 136 is positive. The positive electrophoretic particles 139 are gathered at the proximity of the conductive black matrix 128. In a narrow viewing angle mode, the electrophoretic particles 139 are uniformly dispersed in the dispersion medium 138, like the state in FIG. 2A.

Figure 9:
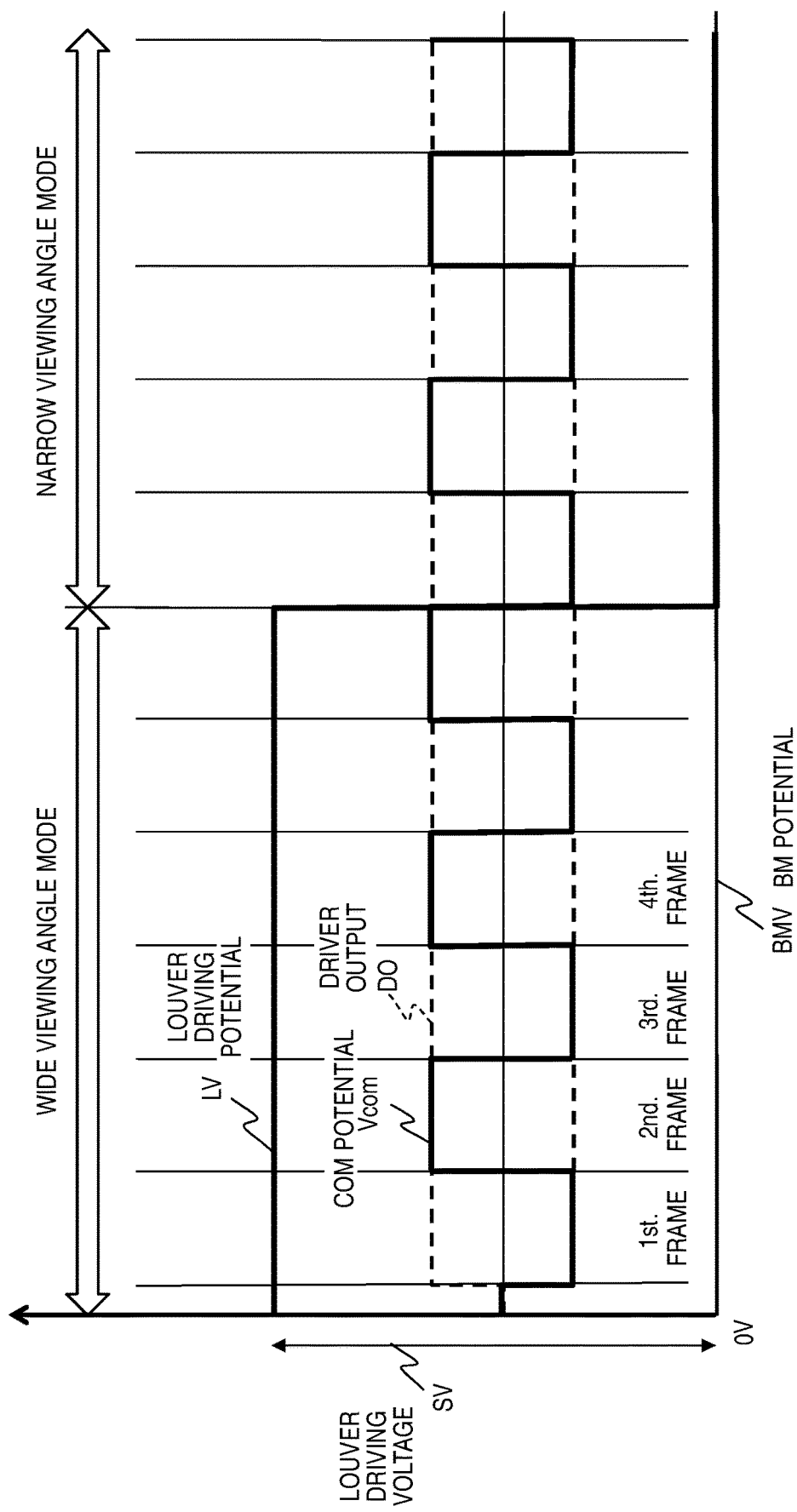
FIG. 9 schematically illustrates a temporal variation in louver driving potential to be given to a louver driving electrode, a temporal variation in BM potential to be given to a conductive black matrix, a temporal variation in driver output potential to be output to a liquid crystal driving electrode, and a temporal variation in COM potential to be given to opposite electrodes in the configuration example in FIG. 7.

FIG. 9 schematically illustrates a temporal variation in louver driving potential (LV) to be given to the louver driving electrode 136, a temporal variation in BM potential (BMV) to be given to the conductive black matrix 128, a temporal variation in driver output potential (DO) to be output to a liquid crystal driving electrode 103, and a temporal variation in COM potential (Vcom) to be given to the opposite electrodes 104 in the configuration example illustrated in FIG. 7. This example provides the opposite electrodes 104 for all pixels with a COM potential (Vcom) common to the opposite electrodes 104.

FIG. 9 indicates only the polarity of the driver output potential (DO) relative to the COM potential (Vcom). In the example of FIG. 9, the COM potential (Vcom) is inverted with respect to the reference potential frame by frame. The driver output potential (DO) is inverted with respect to the reference potential frame by frame. The polarity of the driver output potential (DO) is opposite to the polarity of the COM potential (Vcom) and the direction of the voltage (electric field) applied to the liquid crystal is inverted frame by frame.

The BM potential (BMV) is always at the ground potential (0 V). In a wide viewing angle mode, the louver driving potential (LV) is higher than the BM potential (BMV) by a predetermined voltage (louver driving voltage SV). In a narrow viewing angle mode, the louver driving potential (LV) is grounded and equal to the BM potential (BMV).

In a wide viewing angle mode, the louver driving voltage SV is maintained at a fixed positive value. The louver driving potential LV is positive relative to the BM potential (BMV) of the conductive black matrix 128. The positively charged electrophoretic particles 139 gather to the proximity of the negative conductive black matrix 128. In a narrow viewing angle mode, the louver driving voltage SV is maintained at 0 V. Accordingly, the electrophoretic particles 139 uniformly disperses in the dispersion medium 138.

Figure 10:
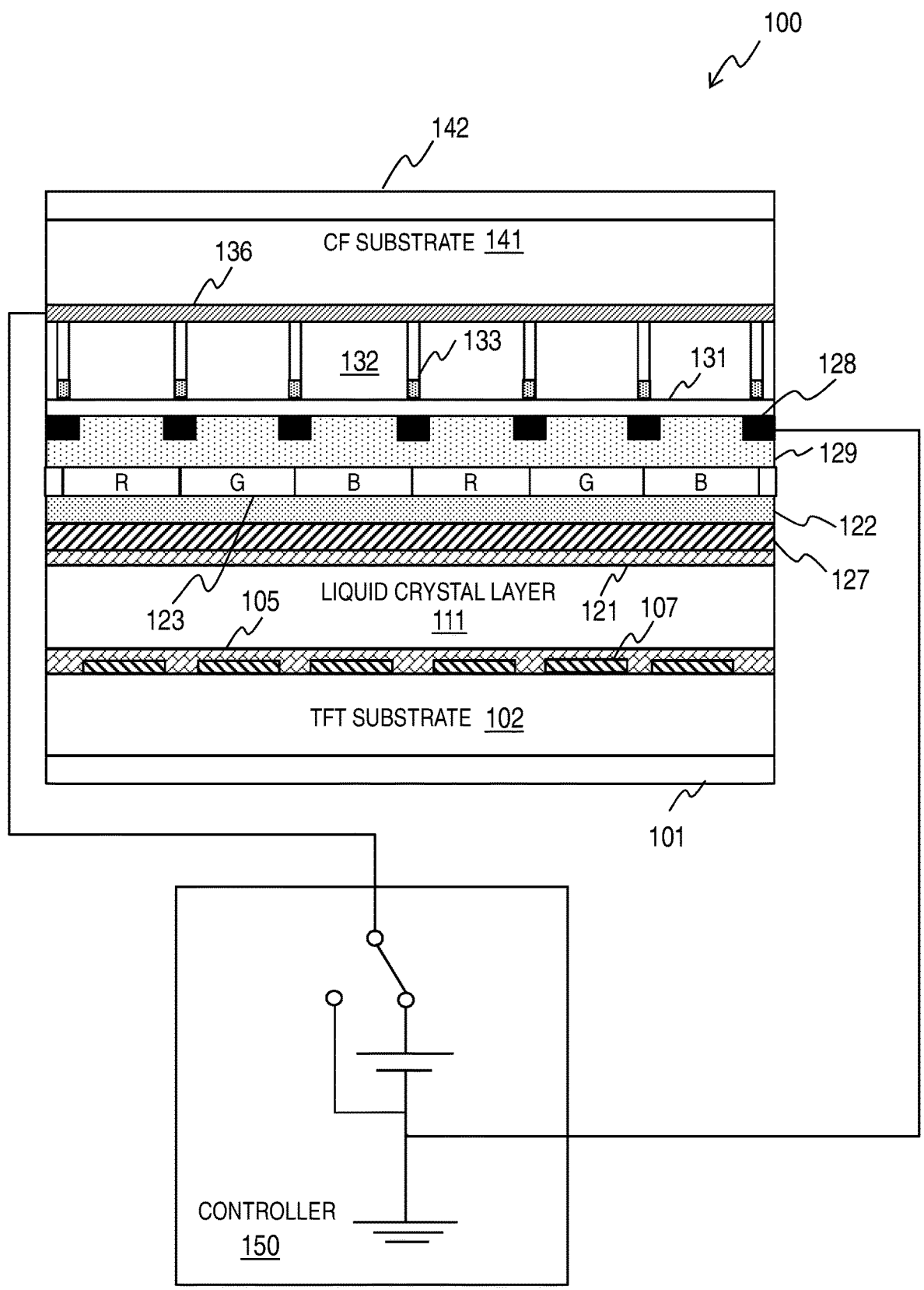
FIG. 10 illustrates another configuration example of the display device in the third embodiment.

FIG. 10 illustrates another configuration example of the display device 100. The display device 100 in FIG. 10 is a vertical electric field control type of liquid crystal display device. In the following, differences from the configuration example of the vertical electric field control type of liquid crystal display device illustrated in FIG. 7 are mainly described. The display device 100 in FIG. 10 includes pixel electrodes 107, in place of the liquid crystal driving electrodes 103 and the opposite electrodes 104. The display device 100 further includes an opposite electrode 127 between the alignment film 121 and the overcoat layer 122. The driving of the conductive black matrix 128 and the louver driving electrode 136 by the controller 150 is the same as the driving described with reference to FIGS. 8 and 9.

In this embodiment, one of the electrodes for driving the louver is in common with the black matrix. This configuration reduces the components in the display device 100 to achieve efficient manufacture of the display device.

The conductive black matrix 128 has a grid-like shape and is grounded. Accordingly, the conductive black matrix 128 functions as a shield electrode for shielding the electric field from the louver driving electrode 136 or the external of the display device to the liquid crystal layer 111.

In the configuration that does not require shield effects of the conductive black matrix 128, the conductive black matrix 128 may be provided with a potential different from the ground potential or potential that varies with time.

Figure 11A:
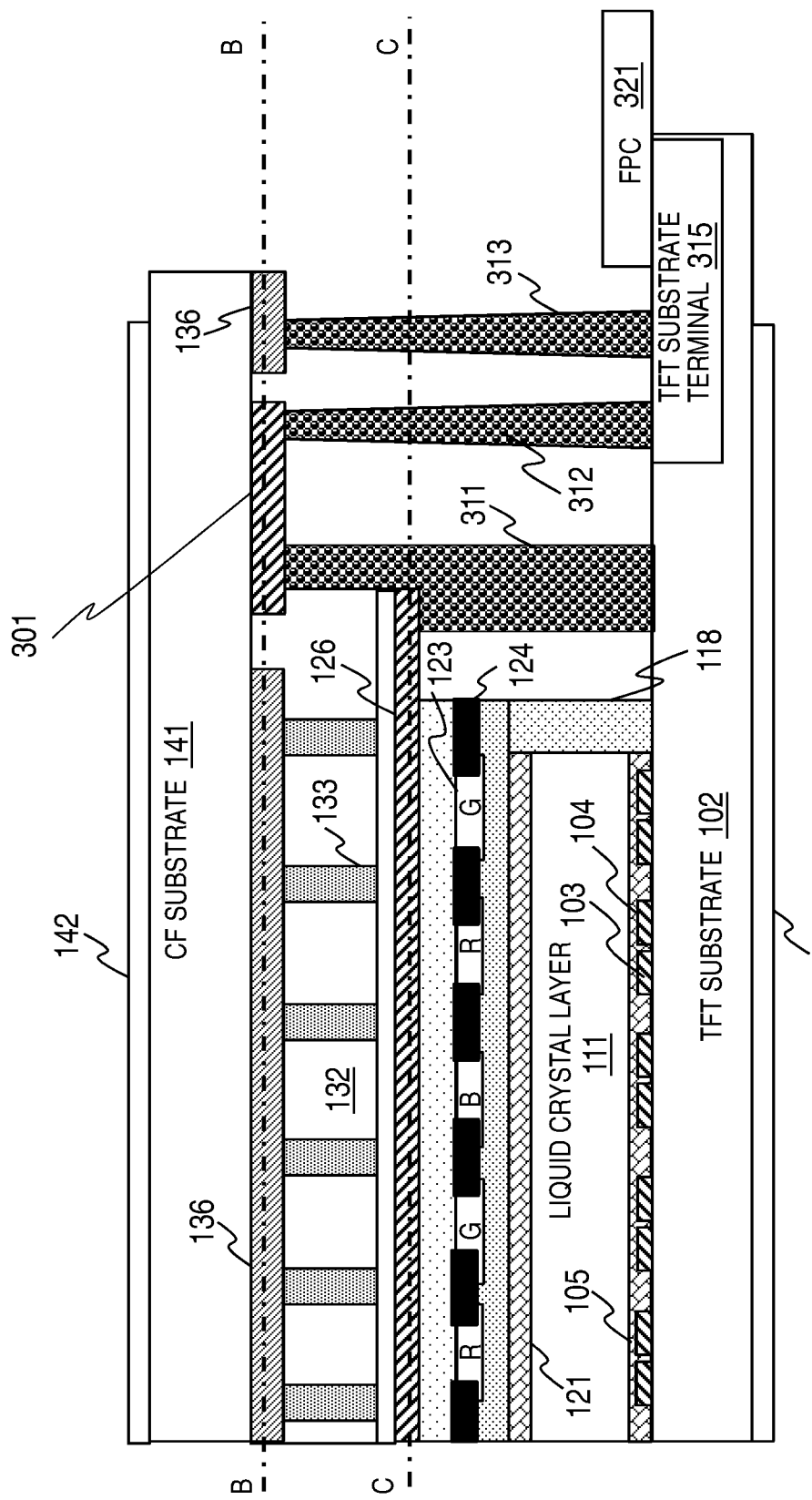
FIG. 11A schematically illustrates wiring in the configuration example described with reference to FIGS. 1B and 1C.
Figure 11B:
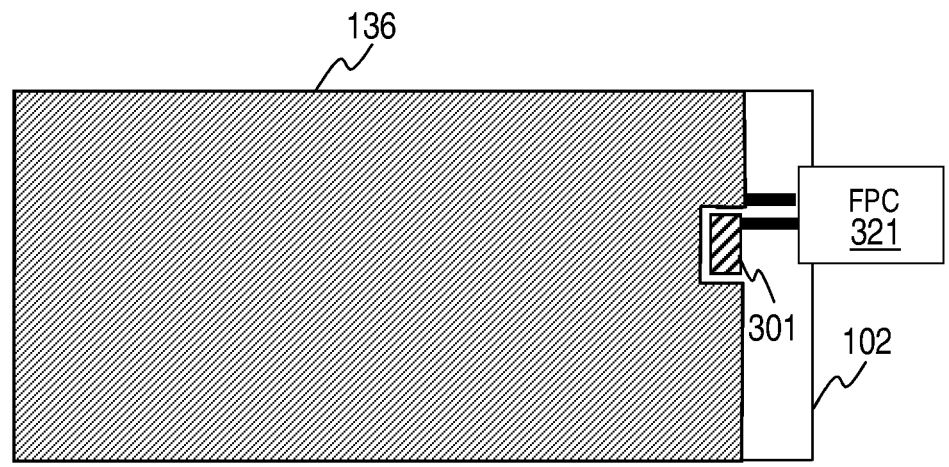
FIG. 11B is a plan diagram along the line B-B in FIG. 11A.
Figure 11C:
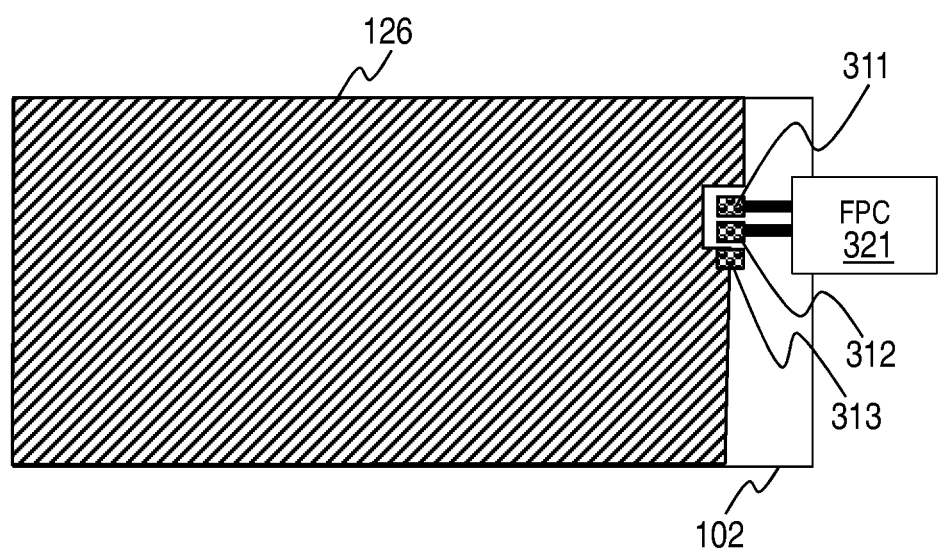
FIG. 11C is a plan diagram along the line C-C in FIG. 11A.

The conductive black matrix 128 capable of driving the louver 135 is applicable to different types of display devices other than the liquid crystal display device. The conductive black matrix 128 is applicable to organic light emitting diode (OLED) display devices, for example, Other Embodiments Hereinafter, examples of wiring between the electrodes sandwiching the louver 135 to drive the louver 135 and the controller 150 are described. FIG. 11A schematically illustrates wiring in the configuration example described with reference to FIGS. 1B and 1C. FIGS. 11B and 11C are plan diagrams along the line B-B and the line C-C, respectively, in FIG. 11A.

Flexible printed circuits (FPC) 321 for interconnecting the controller 150 and the display panel is connected with a TFT substrate terminal 315 on the TFT substrate 102. The TFT substrate terminal 315 is provided outside of a seal 118 surrounding the liquid crystal layer 111 on the main face of the TFT substrate 102 facing the CF substrate 141.

In FIG. 11A, a connector 313 made of a conductive paste interconnects the TFT substrate terminal 315 and the unseparated planar louver driving electrode 136 on the CF substrate 141. A part of the TFT substrate terminal 315 is opposed to a part of the louver driving electrode 136; the parts opposed to each other are interconnected by the connector 313.

A connector 312 made of a conductive paste interconnects the TFT substrate terminal 315 and a connector electrode 301 on the CF substrate 141. The connector electrode 301 is provided on the face of the CF substrate 141 facing the TFT substrate 102 like the louver driving electrode 136. The connector electrode 301 is an island-like electrode and is isolated from the louver driving electrode 136. As illustrated in FIGS. 11B and 11C, the connector electrode 301 is provided in an indent formed by cutting out the other elements on the CF substrate 141. A part of the connector electrode 301 is opposed to a part of the TFT substrate terminal 315; the parts opposed to each other are interconnected by the connector 312.

A connector 311 made of a conductive paste interconnects the connector electrode 301 and the shield electrode 126. The connector electrode 311 interconnects the faces facing the TFT substrate 102 of the connector electrode 301 and the shield electrode 126. The connector 311 may be in contact with the TFT substrate 102 as illustrated in FIG. 11A or be distant from the TFT substrate 102.

The connector electrode 301 on the CF substrate 141 allows formation of connection lines on the CF substrate 141. Since the TFT substrate 102 usually has other connection lines thereon, the lines for driving the louver 135 are easily formed because of the connector electrode 301. The wiring structure in FIGS. 11A, 11B, and 11C is also applicable to the vertical electric field control type of liquid crystal display device illustrated in FIG. 3 or 5.

Figure 12:
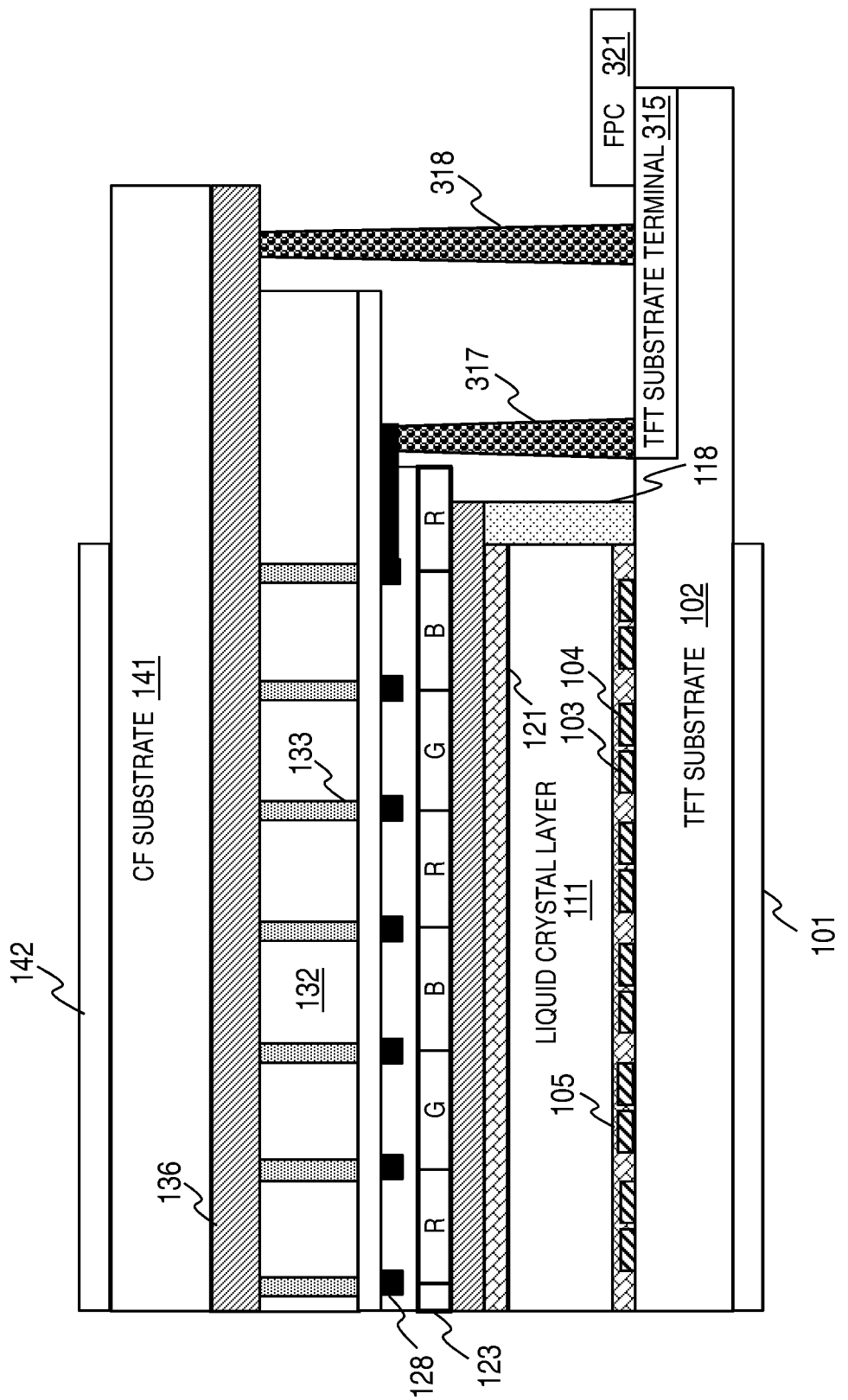
FIG. 12 schematically illustrates wiring in the configuration example described with reference to FIG. 7.

FIG. 12 schematically illustrates wiring in the configuration example described with reference to FIG. 7. The conductive black matrix 128 functions as one of the driving electrodes of each louver element 133. A connector 318 made of a conductive paste interconnects the TFT substrate terminal 315 and the louver driving electrode 136 on the CF substrate 141. A connector 317 made of a conductive paste interconnects the TFT substrate terminal 315 and the conductive black matrix 128.

A part of the louver driving electrode 136 and a part of the black matrix 128 extend to the outside of the seal 118. The connectors 317 and 318 interconnect the TFT substrate terminal 315 with the louver driving electrode 136 and the conductive black matrix 128, respectively, on the outside of the seal 118. The configuration described with reference to FIG. 12 is also applicable to the vertical electric field control type of liquid crystal display device described with reference to FIG. 10.

The configuration examples described with reference to FIG. 11A to 12 enable the FPC 321 connected with the TFT substrate 102 to be connected with the driving electrode for the louver 135 on the CF substrate 141 on the outside of the seal 118. The FPC 321 can be used to transmit both of the signals for controlling the louver 135 and the signals for controlling the liquid crystal layer 111, achieving reduction in components and further, increasing manufacturing efficiency.

As set forth above, embodiments of this disclosure have been described; however, this disclosure is not limited to the foregoing embodiments. Those skilled in the art can easily modify, add, or convert each element in the foregoing embodiment within the scope of this disclosure. A part of the configuration of one embodiment can be replaced with a configuration of another embodiment or a configuration of an embodiment can be incorporated into a configuration of another embodiment.

What is claimed is:

1. A display device configured to display an image with a plurality of pixels, the display device comprising:
   a first substrate;
   a second substrate opposed to the first substrate;
   a liquid crystal layer disposed between the first substrate and the second substrate;
   pixel driving electrodes for the plurality of pixels, the pixel driving electrodes being provided on the first substrate and configured to provide control electric fields to the liquid crystal layer;
   opposite electrodes for the plurality of pixels, the opposite electrodes being provided on the first substrate and configured to provide control electric fields to the liquid crystal layer together with the pixel driving electrodes for the plurality of pixels;
   a plurality of louver elements each including colored electrophoretic particles and liquid encapsulated in a groove of a resin layer;
   a plurality of louver element driving electrodes provided on a face facing the first substrate of the second substrate;
   an unseparated shield electrode disposed between the plurality of louver element driving electrodes and the liquid crystal layer, the shield electrode being provided on the second substrate and being grounded; and
   a controller configured to control potentials of the plurality of louver element driving electrodes,
   wherein each of the plurality of louver elements are configured to:
      stand on the second substrate;
      be sandwiched between one of the plurality of louver element driving electrodes and the shield electrode; and
      change an amount of light to be transmitted in accordance with voltage applied across the louver element driving electrodes and the shield electrode to change a viewing angle,
   wherein the shield electrode is included in a conductive black matrix defining regions of the plurality of pixels, and
   wherein the controller is configured to control potentials of the louver element driving electrodes in such a manner that a polarity of the shield electrode included in the black matrix relative to polarities of the louver element driving electrodes is opposite to a polarity of charge of the colored electrophoretic particles in a wide viewing angle mode.

2. The display device according to claim 1, wherein each of the plurality of louver element driving electrodes is a part of a single planar transparent metal layer.

3. The display device according to claim 1, wherein regions of the plurality of louver elements are included in a region of a black matrix provided on the second substrate when seen in a direction normal to a main face of the second substrate, the black matrix defining regions of the plurality of pixels.

4. The display device according to claim 1,
   wherein the plurality of louver elements include:
      a plurality of first louver elements extending in a first direction and being disposed side by side in a second direction perpendicular to the first direction; and
      a plurality of second louver elements extending in the second direction and being disposed side by side in the first direction, and
   wherein each of the plurality of first louver elements links with the plurality of second louver elements at intersections between the plurality of first louver elements and the plurality of second louver elements.

5. The display device according to claim 1,
wherein the controller is configured to:
provide ground potential to the louver element driving electrodes in a narrow viewing angle mode; and
provide a second fixed potential different from the ground potential to the louver element driving electrodes in the wide viewing angle mode.

* * * * *